United States Patent
Ryu et al.

(10) Patent No.: US 11,350,610 B2
(45) Date of Patent: Jun. 7, 2022

(54) REARING PLACE MANAGEMENT DEVICE AND METHOD

(71) Applicant: LG INNOTEK CO., LTD., Seoul (KR)

(72) Inventors: Seung Hun Ryu, Seoul (KR); Keun Woong Kim, Seoul (KR); Je Yong Shin, Seoul (KR)

(73) Assignee: LG INNOTEK, CO., LTD., Seoul (KR)

( * ) Notice: Subject to any disclaimer, the term of this patent is extended or adjusted under 35 U.S.C. 154(b) by 233 days.

(21) Appl. No.: 16/757,875

(22) PCT Filed: Oct. 25, 2018

(86) PCT No.: PCT/KR2018/012716
§ 371 (c)(1),
(2) Date: Apr. 21, 2020

(87) PCT Pub. No.: WO2019/083299
PCT Pub. Date: May 2, 2019

(65) Prior Publication Data
US 2021/0185987 A1  Jun. 24, 2021

(30) Foreign Application Priority Data
Oct. 25, 2017  (KR) .......................... 10-2017-0139412

(51) Int. Cl.
*G08B 23/00* (2006.01)
*A01K 29/00* (2006.01)
(Continued)

(52) U.S. Cl.
CPC ............ *A01K 29/005* (2013.01); *G06V 10/25* (2022.01); *G06V 40/10* (2022.01); *H04N 5/23296* (2013.01)

(58) Field of Classification Search
CPC ...... A01K 29/005; G06V 10/25; G06V 40/10; H04N 5/23296
See application file for complete search history.

(56) References Cited

U.S. PATENT DOCUMENTS 4,241,871 A * 12/1980 Newell, III .......... A01K 1/0064
236/1 E
5,692,386 A * 12/1997 Casey, Sr. ............ A01K 1/0082
62/176.4
(Continued)

FOREIGN PATENT DOCUMENTS

JP  2002-281853  10/2002
KR  10-1297693  8/2013
(Continued)

OTHER PUBLICATIONS

Niu et al., Survey of Fish Behavior Analysis by Computer Vision (Year: 2018).*
(Continued)

*Primary Examiner* — Quang Pham
(74) *Attorney, Agent, or Firm* — Ked & Associates, LLP (57) ABSTRACT

A rearing place management device according to an embodiment of the present invention includes a photographing unit for photographing a rearing place; a control unit for detecting abnormal signs in the rearing place by comparing behavior patterns in image data obtained by the photographing unit with behavior patterns in normal image data; and a communication unit for transmitting the abnormal signs, wherein the control unit extracts a region of interest including the abnormal signs from the obtained image data, transmits information on the region of interest to the photographing unit, receives, from the photographing unit, image data obtained by photographing the region of interest, and extracts an abnormal region which is narrower than the
(Continued)

region of interest from the behavior patterns in the image data of the region of interest.

20 Claims, 7 Drawing Sheets

(51) Int. Cl.
*H04N 5/232* (2006.01)
*G06V 10/25* (2022.01)
*G06V 40/10* (2022.01)

(56) References Cited

U.S. PATENT DOCUMENTS

| | | | | |
|---|---|---|---|---|
| 6,077,867 A * | 6/2000 | Pageat | ............... | A61K 31/23 514/558 |
| 6,375,612 B1 * | 4/2002 | Guichon | ............... | A01K 29/005 600/300 |
| 6,387,419 B1 * | 5/2002 | Christensen | ............... | A23K 20/30 426/2 |
| 7,765,039 B1 * | 7/2010 | Hagenbuch | ............... | G07C 5/085 701/32.2 |
| 7,847,675 B1 * | 12/2010 | Thyen | ............... | G08B 13/2402 340/5.2 |
| 7,852,500 B2 * | 12/2010 | Miyahara | ............... | H04N 1/00002 358/1.14 |
| 7,864,980 B2 * | 1/2011 | Evans | ............... | G06V 20/52 382/103 |
| 10,058,076 B2 * | 8/2018 | Han | ............... | A01K 29/00 |
| 2002/0135484 A1 * | 9/2002 | Ciccolo | ............... | G16H 40/67 340/573.1 |
| 2003/0130809 A1 * | 7/2003 | Cohen | ............... | A01K 1/031 702/45 |
| 2003/0130815 A1 * | 7/2003 | Cohen | ............... | A01K 1/031 702/140 |
| 2004/0023612 A1 * | 2/2004 | Kriesel | ............... | A01K 11/008 452/157 |
| 2005/0211181 A1 * | 9/2005 | Kleinsasser | ............... | A01K 1/0218 119/503 |
| 2005/0235922 A1 * | 10/2005 | Bryant | ............... | A01K 1/0218 119/446 |
| 2005/0257748 A1 * | 11/2005 | Kriesel | ............... | A01K 29/00 119/51.02 |
| 2007/0221137 A1 * | 9/2007 | Lareau | ............... | A01K 15/02 119/503 |
| 2007/0226801 A1 * | 9/2007 | Gopalan | ............... | H04L 63/145 726/24 |
| 2007/0239723 A1 * | 10/2007 | Roybal | ............... | G06Q 50/02 |
| 2007/0256643 A1 * | 11/2007 | Coiro | ............... | A01K 1/031 119/457 |
| 2007/0262859 A1 * | 11/2007 | Henry | ............... | G01G 23/3728 340/539.11 |
| 2008/0266115 A1 * | 10/2008 | Labrecque | ............... | A01K 1/0227 340/573.3 |
| 2009/0058730 A1 * | 3/2009 | Geissler | ............... | A01K 15/023 342/450 |
| 2010/0150413 A1 * | 6/2010 | Futamura | ............... | G06T 5/002 382/128 |
| 2015/0327518 A1 * | 11/2015 | Han | ............... | A61D 17/00 348/143 |
| 2021/0400240 A1 * | 12/2021 | Kojima | ............... | H04N 5/445 |

FOREIGN PATENT DOCUMENTS

| | | |
|---|---|---|
| KR | 10-2013-0128120 | 11/2013 |
| KR | 10-1607934 | 3/2016 |
| KR | 10-1752399 | 6/2017 |

OTHER PUBLICATIONS

Shin et al., Behavior Monitoring Using Learning Techniques and Regular-Expressions-Based Pattern Matching (Year: 2018).*
International Search Report dated Jan. 30, 2019 issued in Application No. PCT/KR2018/012716.

* cited by examiner

REARING PLACE MANAGEMENT DEVICE AND METHOD

CROSS-REFERENCE TO RELATED PATENT APPLICATIONS

This application is a U.S. National Stage Application under 35 U.S.C. §371 of PCT Application No. PCT/KR2018/012716, filed Oct. 25, 2018, which claims priority to Korean Patent Application No. 10-2017-0139412, filed Oct. 25, 2017, whose entire disclosures are hereby incorporated by reference.

TECHNICAL FIELD

The present invention relates to a rearing place management device and method.

BACKGROUND ART

Livestock that are raised in groups within a narrow rearing place are very vulnerable to the spread of infectious diseases. For example, officially designated infectious diseases, such as foot-and-mouth disease and avian influenza, are spread through the air and thus the social cost of preventing and blocking the infectious diseases once they have occurred is very high and the entire social anxiety about food may spread rapidly. It is important to isolate diseased livestock as soon as possible to prevent the spread of the disease when an abnormal sign is detected in the rearing place.

To this end, attempts have been made to monitor a state of livestock in a rearing place in real time using a camera and to transmit information about an abnormal sign to an administrator terminal when the abnormal sign is detected. In this case, sick livestock may be identified by attaching an identification tag to each animal and recognizing the identification tag in an image obtained by the camera.

However, this method is applicable to only livestock such as cows, goats and pigs but is difficult to apply to poultry, such as chickens and ducks, which are small in size and are raised in high-density places.

DISCLOSURE

Technical Problem

The present invention is directed to providing a device and method for managing a rearing place in a rearing environment in which it is difficult to attach an identification tag to each animal.

Technical Solution

One aspect of the present invention provides a rearing place management device including a photographing unit configured to generate image data by photographing a rearing place; a controller configured to detect an abnormal sign in the rearing place by comparing a behavior pattern in the image data generated by the photographing unit with a behavior pattern in normal image data; and a communicator configured to transmit information about the abnormal sign, wherein the controller extracts a region of interest including the abnormal sign from the generated image data, transmits information about the region of interest to the photographing unit, receives image data obtained by photographing the region of interest from the photographing unit, and extracts an abnormal region narrower than the region of interest from a behavior pattern in the image data of the region of interest.

The photographing unit may adjust a shooting angle and magnification of the photographing unit using the information about the region of interest to photograph the region of interest.

The rearing place management device may further include a sensor unit configured to sense the abnormal sign in the rearing place, and the photographing unit may be activated when the abnormal sign is sensed by the sensor unit.

The rearing place management device may further include a lighting controller configured to adjust an intensity of illuminance in the rearing place. The sensor unit may include a sound sensor configured to sense sound in the rearing place. When the abnormal sign is sensed by the sound sensor, the lighting controller may increase the intensity of illuminance in the rearing place and the photographing unit may be activated.

The rearing place management device may further include a lighting controller configured to adjust an intensity of illuminance in the rearing place. The sensor unit may include an odor sensor configured to sense an odor in the rearing place. When the abnormal sign is sensed by the odor sensor, the lighting controller may increase the intensity of illuminance in the rearing place and the photographing unit may be activated.

A plurality of odor sensors may be installed to be spaced apart from each other in the rearing place. Information about a position of each of the plurality of odor sensors may be stored in the controller. When the abnormal sign is sensed by one of the plurality of odor sensors, the controller may control the photographing unit to control a shooting angle and magnification with respect to the vicinity of the one odor sensor.

The photographing unit may include an upper photographing unit on an upper part of the rearing place and at least one side photographing unit at a side of the rearing place, and the controller may synchronize image data obtained by the upper photographing unit with image data obtained by the at least one side photographing unit in real time.

Another aspect of the present invention provides a rearing place management method including photographing a rearing place by a photographing unit; detecting, by a controller, an abnormal sign in the rearing place by comparing a behavior pattern in image data obtained by the photographing unit with a behavior pattern in normal image data; transmitting information about the abnormal sign to an administrator terminal by a communicator; extracting, by the controller, a region of interest including the abnormal sign from the obtained image data; transmitting, by the controller, information about the region of interest to the photographing unit; receiving, by the controller, image data obtained by photographing the region of interest from the photographing unit; and extracting, by the controller, an abnormal region narrower than the region of interest from the behavior pattern in the image data obtained by photographing the region of interest.

The photographing unit may adjust a shooting angle and magnification thereof using the information about the region of interest to photograph the region of interest.

The rearing place management method may further include sensing the abnormal sign in the rearing place by a sensor unit and include activating the photographing unit.

The rearing place management method may further include increasing an intensity of illuminance in the rearing place by a lighting controller after the sensing of the abnormal sign in the rearing place.

The sensor unit may include a plurality of odor sensors installed to be spaced apart from each other in the rearing place, and the sensing of the abnormal sign in the rearing place may include, when one of the plurality of odor sensors senses an abnormal sign in the rearing place, the controller controls the photographing unit to adjust the shooting angle and magnification with respect to the vicinity of the one odor sensor.

Advantageous Effects

With a rearing place management device according to an embodiment of the present invention, diseased livestock in a rearing place may be isolated within a short time even in a rearing environment in which it is difficult to attach an identification tag to each animal.

In a rearing place management device according to an embodiment of the present invention, various types of sensors are used and thus an abnormal sign in a rearing place may be accurately detected within a short time.

In addition, a rearing place management device according to an embodiment of the present invention is capable of reducing power consumption.

MODES OF THE INVENTION

Various changes may be made in the present invention and various embodiments may be implemented, and thus, example embodiments are illustrated in the drawings and described herein. However, it should be understood that the present invention is not limited to particular embodiments and includes all modifications, equivalents, and alternatives falling within the idea and scope of the present invention.

Terms, including ordinal numbers such as second and first, may be used to describe various components but these components are not limited by the terms. The terms are only used to distinguish one component from another. For example, a second component may be referred to as a first component without departing from the scope of the present invention, and similarly, a first component may also be referred to as a second component. The term "and/or" includes a combination of a plurality of related items described herein or any one of the plurality of related items.

When a component is referred to as being "coupled to" or "connected" to another component, it should be understood that the component may be directly coupled to or connected to the other component but another component may be interposed therebetween. In contrast, when a component is referred to as being "directly coupled to" or "directly connected" to another component, it should be understood that no component is interposed therebetween.

The terms used in this application are only used to describe certain embodiments and are not intended to limit the present invention. As used herein, the singular expressions are intended to include plural forms as well, unless the context clearly dictates otherwise. It should be understood that the terms "comprise" and/or "comprising", when used herein, specify the presence of stated features, integers, steps, operations, elements, components, or a combination thereof, but do not preclude the presence or addition of one or more features, integers, steps, operations, elements, components, or a combination thereof.

Unless defined otherwise, all terms used herein, including technical or scientific terms, have the same meaning as commonly understood by those of ordinary skill in the art to which the present invention pertains. Terms such as those defined in a commonly used dictionary should be interpreted as having meanings consistent with meanings in the context of related technologies and should not be interpreted as ideal or excessively formal meanings unless explicitly defined in the present application.

Hereinafter, embodiments will be described in detail with reference to the accompanying drawings, but the same or corresponding components are assigned the same reference numbers even in different drawings and are not redundantly described herein.

Figure 1:
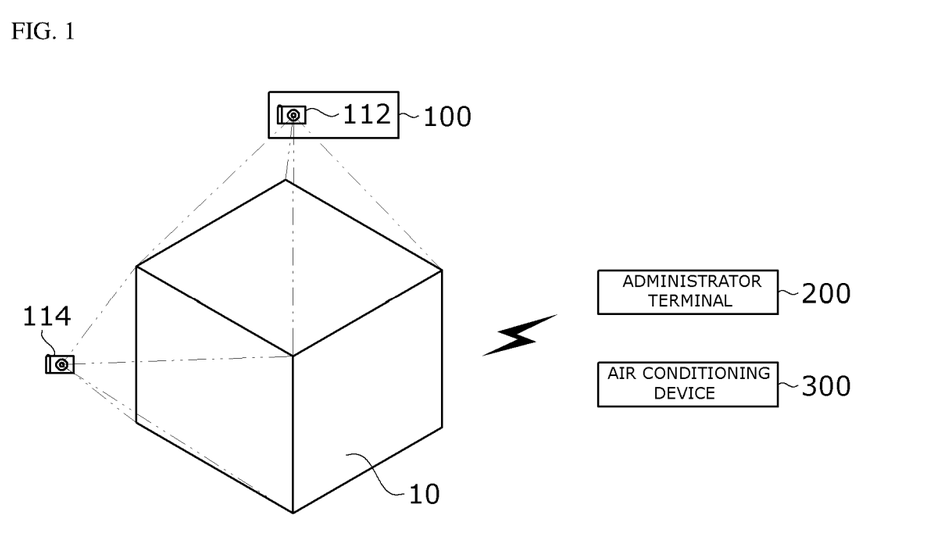
FIG. 1 illustrates a rearing place management system according to an embodiment of the present invention.
Figure 2:
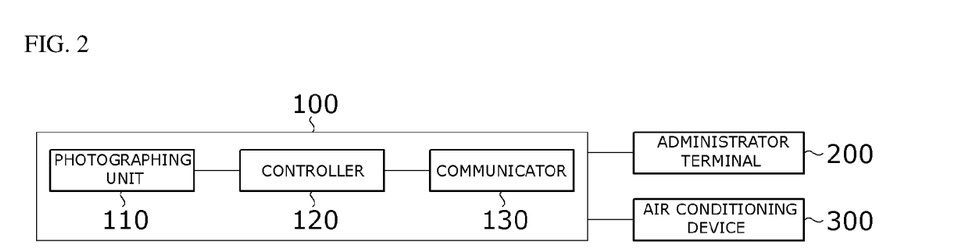
FIG. 2 is a block diagram of a rearing place management system according to an embodiment of the present invention.

FIG. 1 illustrates a rearing place management system according to an embodiment of the present invention. FIG. 2 is a block diagram of a rearing place management system according to an embodiment of the present invention.

Referring to FIGS. 1 to 2, a rearing place management system according to an embodiment of the present invention includes a rearing place management device 100, an administrator terminal 200, and an air conditioning device 300.

A rearing place 10 refers to a livestock pen for raising livestock. The livestock may refer to various types of animals which are raised in groups within a livestock pen, such as cows and pigs, as well as poultry such as chickens and ducks.

The rearing place management device 100 identifies an environment in the rearing place 10 and transmits information about the environment to at least one of the administrator terminal 200 and the air conditioning device 300. To this end, the rearing place management device 100 may communicate with the administrator terminal 200 and the air conditioning device 300 by wire or wireles sly. Here, although the rearing place management device 100 is illustrated as communicating with the administrator terminal 200 and the air conditioning device 300, it is not limited thereto, and the rearing place management device 100 communicates with the administrator terminal 200, and the administrator terminal 200 may communicate with the air conditioning device 300.

The administrator terminal 200 may be a personal computer (PC), a tablet PC, a portable terminal, or the like of an administrator or may be a server for managing a rearing place. When the rearing place management device 100 transmits the information about the environment in the rearing place 10 to the administrator terminal 200, the administrator may recognize the environment in the rearing place 10 through an image output to the administrator terminal 200 or the like. For example, when the rearing place management device 100 detects an abnormal situation in the rearing place 10 and transmits information about the abnormal situation to the administrator terminal 200, the administrator may recognize the occurrence of the abnormal situation in the rearing place 10 through an image output to the administrator terminal 200 and respond to the abnormal situation at an initial stage. Here, the abnormal situation may refer to, for example, the occurrence of diseased livestock, pregnancy of livestock, an abnormal temperature in the rearing place 10, or the like.

The air conditioning device 300 is a device that controls a temperature of the rearing place 10. When the rearing place management device 100 detects an abnormal temperature in the rearing place 10 and transmits information thereof to the administrator terminal 200, an administrator may recognize the abnormal temperature in the rearing place 10 through an image output to the administrator terminal 200 and control the air conditioning device 300 to normalize the temperature in the rearing place 10. Alternatively, when the rearing place management device 100 detects an abnormal temperature in the rearing place 10 and directly transmits information about the abnormal temperature to the air conditioning device 300, the air conditioning device 300 may directly normalize the temperature in the rearing place 10. For example, when the temperature in the rearing place 10 is lower or higher than a temperature suitable for livestock, the movement of livestock tends to be slow. Accordingly, the rearing place management device 100, the administrator terminal 200, or the air conditioning device 300 may detect the abnormal temperature in the rearing place 10 and normalize the temperature in the rearing place 10.

The rearing place management device 100 includes a photographing unit 110, a controller 120, and a communicator 130. The photographing unit 110 photographs the rearing place 10. A plurality of photographing units 110 may be installed. For example, the photographing unit 110 may include an upper photographing unit 112 disposed on the top of the rearing place 10 and at least one side photographing unit 114 disposed at a side of the rearing place 10. Each of the upper photographing unit 112 and the at least one side photographing unit 114 may be an Internet protocol (IP) camera capable of transmitting image data in real time by establishing wired or wireless communication. At least one of the upper photographing unit 112 and the at least one side photographing unit 114 may include a fish-eye lens or a wide-angle lens having a wide viewing angle. Accordingly, an entire inner space of the rearing place 10 may be photographed by the photographing unit 110.

The photographing unit 110 may obtain an image including a plurality of objects. In an embodiment of the present invention, the plurality of objects may refer to poultry that is raised in a rearing place. The photographing unit 110 may generate image data using an image including a plurality of objects. A piece of image data may refer to a single frame. The photographing unit 110 may generate a plurality of pieces of image data using images which are obtained sequentially.

The photographing unit 110 may be an image sensor that photographs a subject using a complementary metal-oxide semiconductor (CMOS) module or a charge-coupled device (CCD) module. In this case, an input image data frame is provided to the CMOS module or CCD module in the photographing unit 110 through a lens, and the CMOS module or the CCD module converts an optical signal of the subject passing through the lens into an electrical signal (image data) and outputs the electrical signal (the image data).

The photographing unit 110 may include a fish-eye lens or a wide-angle lens having a wide viewing angle. Accordingly, the entire inner space of the rearing place 10 may be photographed by one photographing unit 110.

Alternatively, the photographing unit 110 may be a depth camera. The photographing unit 110 may be driven by any one of various depth recognition methods, and an image obtained by the photographing unit 110 may include depth information. The photographing unit 110 may be, for example, a Kinect sensor. The Kinect sensor is a structured light projection type depth camera and may obtain three-dimensional (3D) information of a scene by projecting pattern image data defined using a projector or laser and obtaining pattern-projected image data through a camera. The Kinect sensor includes an infrared emitter that emits a pattern using infrared laser, and an infrared camera that obtains infrared image data. An RGB camera, which functions like a general webcam, is placed between the infrared emitter and the infrared camera. The Kinect sensor may further include a pan-tilt part for adjusting an arrangement of a microphone and an angle of a camera.

A basic principle of the Kinect sensor is that when a laser pattern emitted by the infrared emitter is projected to and reflected from an object, a distance to a surface of the object is calculated using a position and size of the pattern at a point to which the laser pattern is reflected. According to this principle, the photographing unit 110 may emit a laser pattern into an inner space of a livestock pen and sense the laser pattern reflected from each object to generate image data including depth information of each object.

The controller 120 detects (or identifies) an abnormal sign in the rearing place 10 by comparing behavior patterns of objects in image data obtained by the photographing unit 110 with behavior patterns of the objects in normal image data obtained by the photographing unit 110. Here, the normal image data refers to image data obtained by photographing a normal-state rearing place in advance under the same conditions, and the normal-state rearing place refers to a rearing place in which there is no diseased livestock. To this end, the controller 120 may be trained in advance with an animal behavior pattern in the normal image data and detect an abnormal sign by comparing a behavior pattern of an object of obtained image data with the trained animal behavior pattern. Here, the behavior pattern may include a frequency of motion, a speed of motion, a range of motion, a frequency of blinking, a coughing frequency, and the like. That is, the controller 120 may detect an abnormal sign through a deep learning technique.

The controller 120 may identify a behavior pattern of an object by detecting motion in the image data.

For example, the controller 120 may detect a movement at a specific point or a movement of a specific object or a specific pixel in a distribution diagram using a single piece of image data or a plurality of pieces of consecutive image data.

Alternatively, the controller 120 may detect a motion of a moving object using a dense optical flow method. The controller 120 may detect a motion of each pixel in image data by calculating a motion vector of each pixel. In the case of the dense optical flow method, motion vectors of all pixels are calculated, and thus, detection accuracy is improved but the amount of calculation relatively increases. Therefore, the dense optical flow method is applicable to specific regions in which high detection accuracy is required, e.g., a rearing place in which the occurrence of an abnormal situation is suspected or a rearing place in which there are a very large number of animals.

Alternatively, the controller 120 may detect a motion of a moving object using a sparse optical flow method. The controller 120 may detect a motion by calculating motion vectors only of some pixels of image data, e.g., edges, the motion of which is easy to track. When the sparse optical flow method is used, the amount of calculation is reduced but a result of only a limited number of pixels may be obtained. Therefore, the sparse optical flow method is applicable to rearing places in which there are a small number of objects or specific regions in which objects do not appear redundantly.

Alternatively, the controller 120 may detect a motion of a moving object by block matching. The controller 120 may detect a motion by dividing image data into equal or non-equal regions and calculating motion vectors of the regions. In block matching, a motion vector of each of the regions is calculated and thus the amount of calculation is reduced, but a result for the motion vector of each of the regions is calculated and thus detection accuracy may be relatively low. Therefore, block matching may be applied to a rearing place in which there are a small number of objects or a specific region in which objects do not appear redundantly.

Alternatively, the controller 120 may detect a motion of a moving object using a continuous frame difference method. The controller 120 may detect a motion by comparing continuous image data frames in units of pixels and calculating the differences between the image data frames. Because in the continuous frame difference method, a motion is detected using the differences between frames, the total amount of calculation is reduced but accuracy of detection of a bulky object or an object appearing redundantly may be relatively low. In addition, with the continuous frame difference method, it is not possible to distinguish between background image data and moving objects and thus accuracy may be relatively low. Therefore, the continuous frame difference method may be applied to a rearing place in which there are a small number of objects or a specific region in which objects do not appear redundantly.

Alternatively, the controller 120 may detect a motion of a moving object by a background subtraction method. The controller 120 may detect a motion by comparing continuous image data frames in units of pixels in a state in which background image data is initially learned and calculating the differences between the image data frames. In the background subtraction method, the background image data is learned in advance and thus may be distinguished from non-moving objects. Therefore, a separate process of filtering the background image data is required and thus the amount of calculation increases but accuracy is improved. Therefore, the background subtraction method may be applied to specific regions in which very high detection accuracy is required, e.g., a rearing place in which the occurrence of an abnormal situation is suspected or a rearing place in which there are a very large number of animals. Background image data may be continuously updated in the background subtraction method.

The controller 120 may detect a motion in a distribution diagram using an appropriate method according to an environment in a rearing place and external setting.

More specifically, the controller 120 extracts a region of interest including an abnormal sign from image data obtained by the photographing unit 110 and extracts a region of an abnormal sign which is smaller than the region of interest according to a behavior pattern in the region of interest.

For example, the controller 120 may identify a level of abnormal signs according to a similarity between a behavior pattern in the obtained image data and a behavior pattern in a normal image data and divide the region of interest into a first region of interest, a second region of interest, and a third region of interest. In an embodiment of the present invention, the first region of interest is a region in which the similarity between the behavior pattern in the obtained image data and the behavior pattern in the normal image data is lowest and may refer to a region determined to have the highest-level abnormal sign. The third region of interest is a region in which the similarity between the behavior pattern in the obtained image data and the behavior pattern in the normal image data is highest and may refer to a region determined to have a lowest-level abnormal sign. The second region of interest is a region having a level of an abnormal sign which is a median between the level of the first region of interest and the level of the second region of interest.

The controller 120 may calculate the sum of the motion vectors of the regions according to the detected motion vectors and compare the sum of the motion vectors of the regions with a predetermined threshold to divide the region of interest into the first region of interest, the second region of interest, and the third region of interest. The controller 120 may set, for example, a first threshold and a second threshold for the sum of motion vectors. The first threshold may be greater than the second threshold. The controller 120 may classify this region as the third region of interest when the sum of motion vectors of a specific region is greater than the first threshold, classify this region as the first region of interest when the sum of motion vectors of the specific region is less than the second threshold, and classify this region as the second region of interest when the sum of motion vectors of the specific region is a value between the first threshold and the second threshold. That is, the controller 120 may classify a region in which quick motion is detected as a region having a low-level abnormal sign and a region in which no motion is detected as a region having a high-level abnormal sign.

In this case, the controller 120 may synchronize image data obtained by the upper photographing unit 112 and image data obtained by the at least one side photographing unit 114 with each other in real time. Accordingly, an abnormal sign may be detected more quickly and accurately in the rearing place 10.

The controller 120 may control the photographing unit 110 to differently set an orientation and a magnification of the region of interest according to the first region of interest, the second region of interest, and the third region of interest. For example, the controller 120 may set a magnification to be high such that the first region of interest determined to have the highest level of an abnormal sign may be more precisely photographed than the second region of interest determined to have a relatively low level abnormal sign. In addition, the controller 120 may set an angle of the photographing unit 110 such that the first region of interest determined to have the highest level abnormal sign may be more precisely photographed than the second region of interest determined to have the relatively low level of an abnormal sign.

In this case, the controller 120 may control the pan-tilt part of the photographing unit 110 to control the angle of the photographing unit 110. The pan-tilt part may drive two motors, e.g., a pan motor (a horizontal direction) and a tilt motor (a vertical direction), to control a region to be photographed by the photographing unit 110. The pan-tilt part may adjust an orientation of the photographing unit 110 to photograph the region of interest under control of the controller 120. In addition, the pan-tilt part may adjust the orientation of the photographing unit 110 to track a specific object under control of the controller 120.

When the controller 120 detects an abnormal sign in the rearing place 10, the communicator 130 transmits information regarding the abnormal sign to the administrator terminal 200. Here, the communicator 130 may transmit the information regarding the abnormal sign to the administrator terminal 200 by wire or wirelessly.

The communicator 130 may establish data communication with the administrator terminal 200. For example, the communicator 130 may establish data communication using wide-area communication technology, e.g., a wireless local area network (LAN) (WLAN), Wi-Fi, wireless broadband (WiBro), world interoperability for microwave access (WiMAX), a high-speed downlink packet (HSDPA), IEEE 802.16, long-term evolution (LTE), or a wireless mobile broadband service (WMBS).

Alternatively, the communicator 130 may include Bluetooth, RadioFrequency Identification (RFID), Infrared Data Association (IrDA), ultra-wideband (UWB), ZigBee, or near-field communication (NFC). Alternatively, data communication may be established using wired communication technology, e.g., short-range communication technology such as USB communication, Ethernet, serial communication, or optical/coaxial cable.

Data transmitted through the communicator 130 may be compressed data encoded by an encoder.

A display may include at least one of a liquid crystal display (LCD), a thin-film transistor-liquid crystal display (TFT-LCD), an organic light-emitting diode (OLED), a flexible display, a three-dimensional display (3D) display, and an e-ink display.

The display 140 may display image data in which a region of interest or an abnormal region detected by the controller 120 is displayed.

The display 140 may output original image data obtained by the photographing unit 110 to a screen.

The display 140 may output various user interfaces or graphical user interfaces to the screen.

A user interface unit 150 generates input data for controlling an operation of the rearing place management device 100. The user interface unit 150 may include a keypad, a dome switch, a touch pad, a jog wheel, a jog switch, or the like. When the display140 and a touch pad form a layer structure together to make a touch screen, the display 140 may be used as an input device as well as an output device.

The user interface 150 may receive various commands for operating the rearing place management device 100.

An encoder 160 encodes original image data obtained by the photographing unit 110 or image data processed by the controller 120 or the like into a digital signal. For example, the encoder 160 may encode image data according to a standard, e.g., H.264, H.265, Moving Picture Experts Group (MPEG), or Motion Joint Photographic Experts Group (M-JPEG).

A database 170 (not shown?) includes at least one storage medium among a flash memory type database, a hard disk type database, a multimedia card micro type database, card type memory (e.g., SD or XD memory), a magnetic memory, a magnetic disk, an optical disk, random access memory (RAM), static random access memory (SRAM), read-only memory (ROM), electrically erasable programmable read-only memory (EPMROM), and programmable ROM (PROM). The rearing place management device 100 may operate web storage performing a storage function of the database 170 on the Internet or operate in connection with the web storage.

The database 170 may store image data obtained by the photographing unit 110 and store image data previously obtained for a certain time period.

In addition, the database 170 may store data, programs, and the like necessary to operate the rearing place management device 100.

Furthermore, the database 170 may store various user interfaces (UIs) or graphical user interfaces (GUIs).

The rearing place management device 100 according to an embodiment of the present invention may be embodied as a single module or a plurality of modules. For example, the photographing unit 110, the controller 120, the communicator 130, the display 140, the user interface unit 150, the encoder 160 and the database 170 may be included in one module together or installed in an upper part of the rearing place 10. Alternatively, the upper photographing unit 112, the controller 120, the communicator 130, the display 140, the user interface unit 150, the encoder 160, and the database 170 may be included in one module together and installed in an upper part of the rearing place 10. The at least one side photographing unit 114 may be installed at a side of the rearing place 10 to transmit obtained image data to the controller 120 in real time.

Alternatively, the photographing unit 110, the communicator 130, the display 140, the user interface unit 150, the encoder 160, and the database 170 may be included in one module together, and the controller 120 may be included outside, e.g., the administrator terminal 200 or a server. In this case, the photographing unit 110 may obtain image data of the inside of the rearing place 10, the communicator 130 may transmit the image data to the controller installed outside, and the controller 120 may detect an abnormal sign in the rearing place 10.

Figure 3:
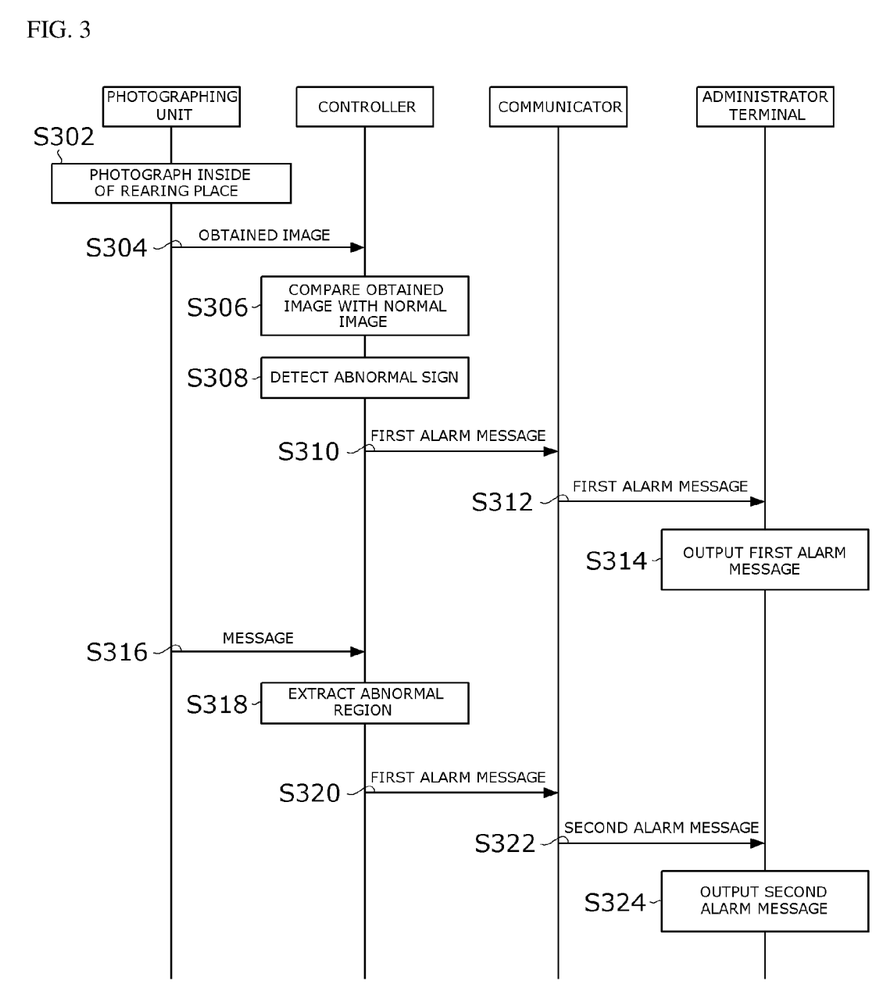
FIG. 3 is a flowchart of a rearing place management method performed by a rearing place management device according to an embodiment of the present invention.
Figure 4:
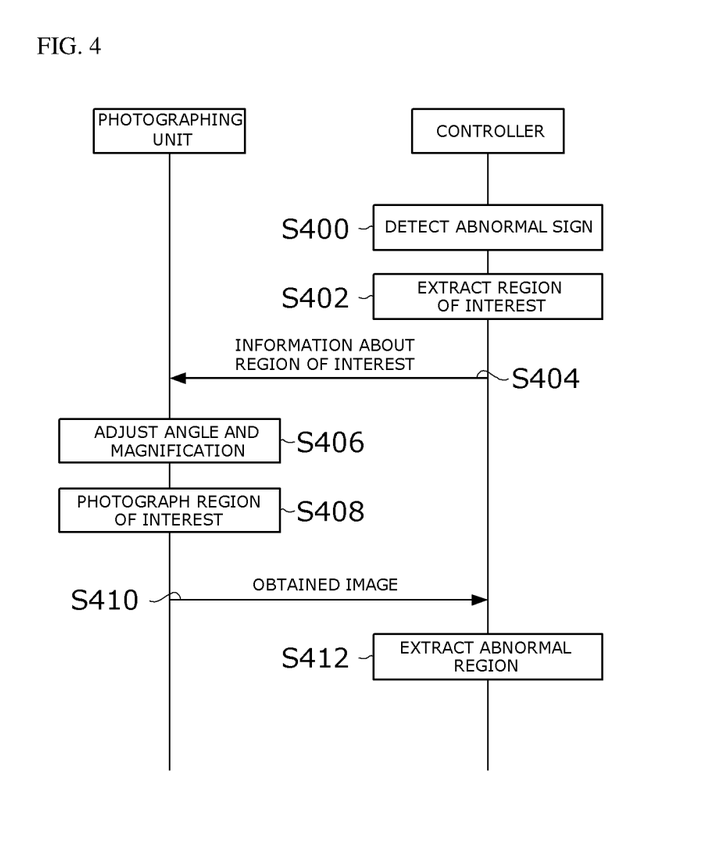
FIG. 4 is a detailed flowchart of a method of extracting an abnormal region, which is included in the rearing place management method of FIG. 3.

FIG. 3 is a flowchart of a rearing place management method performed by a rearing place management device according to an embodiment of the present invention. FIG. 4 is a detailed flowchart of a method of extracting an abnormal region which is included in the rearing place management method of FIG. 3.

Referring to FIG. 3, the photographing unit 110 photographs the inside of the rearing place 10 (S302). The inside of the rearing place 10 may be photographed by the upper photographing unit 112 on the upper part of the rearing place 10 and the at least one side photographing unit 114 at the side of the rearing place 10.

When the photographing unit 110 transmits image data obtained by photographing the inside of the rearing place 10 to the controller 120 (S304), the controller 120 compares a behavior pattern in the image data with a behavior pattern in the normal image data (S306) and detects an abnormal sign (S308). For example, when poultry such as chickens or ducks catches avian influenza, the frequency of motion thereof may significantly reduce. Thus, when a region showing a frequency of motion lower than that in the normal image data is detected, the controller 120 may detect the lower frequency of motion as an abnormal sign.

When the controller 120 detects an abnormal sign, the controller 120 transmits a first alarm message to the communicator 130 (S310), the communicator 130 transmits the first alarm message to the administrator terminal 200 (S312), and the administrator terminal 200 outputs the first alarm message to a screen (S314). When the administrator terminal 200 outputs the first alarm message to the screen, an administrator may recognize that an abnormal sign has occurred in the rearing place 10.

The photographing unit 110 continuously photographs the inside of the rearing place 10 and transmits obtained image data to the controller 120 (S316). The controller 120 extracts an abnormal region from the obtained image data received from the photographing unit 110 (S318), transmits a second alarm message to the communicator 130 (S320), the communicator 130 transmits the second alarm message to the administrator terminal 200 (S322), and the administrator terminal 200 outputs the second alarm message to the screen (S324). The second alarm message may include information about a specific location of the abnormal region. When the administrator terminal 200 outputs the second alarm message to the screen, the administrator may identify the abnormal region of the rearing place 10 in which the abnormal sign has occurred and thus may quickly isolate sick animals. Here, the information about the specific location of the abnormal region may be a result of calibrating an actual location of the abnormal region in the rearing place 10 from the coordinates of the abnormal region in the image data.

More specifically, referring to FIG. 4, when the controller 120 detects an abnormal sign in image data obtained by the photographing unit 110 (S400), that is, in S308 of FIG. 3, the controller 120 extracts a region of interest from the obtained image data (S402). Here, the region of interest refers to a region including the abnormal sign. The region of interest may be wider than a region in which the abnormal sign is detected. For example, the region of interest may be a region that includes a region in which a frequency of motion is very low.

Next, the controller 120 transmits information about the region of interest to the photographing unit 110 (S404). Here, the information regarding the region of interest may include information about coordinates in the rearing places 10.

Accordingly, the photographing unit 110 adjusts an angle and a magnification to face the region of interest (S406) and photographs the region of interest (S408). As described above, when the photographing unit 110 photographs the region of interest by adjusting the angle and magnification to face the region of interest, the region of interest may be photographed more precisely.

When the photographing unit 110 transmits image data obtained by photographing the region of interest to the controller 120 (S410), the controller 120 extracts an abnormal region smaller than the region of interest from a behavior pattern in the region of interest (S412). In this case, similar to operation S400, the abnormal region may be extracted by comparing the behavior pattern in the region of interest with a behavior pattern in a normal image data. In this case, operations S404 to S412 may be repeatedly performed several times. Therefore, a range of the abnormal region may be gradually reduced and thus an administrator is able to extract diseased livestock more quickly even in a rearing environment in which identification tags cannot be attached to each animal.

As described above, according to an embodiment of the present invention, a location of diseased livestock may be extracted while gradually reducing a range of a region in which an abnormal sign in the rearing place 10 is detected. Accordingly, even when the diseased livestock are moving in an initial imaging stage, e.g., after the detecting of the abnormal sign in operation S400, the diseased livestock are highly likely to be located in the region of interest and thus an accurate location thereof may be tracked step by step.

Figure 5:
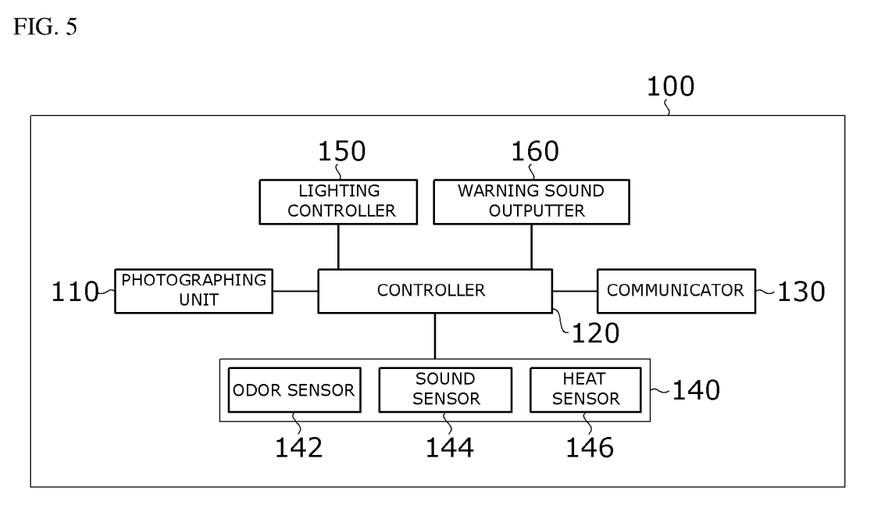
FIG. 5 is a block diagram of a rearing place management device according to another embodiment of the present invention.

FIG. 5 is a block diagram of a rearing place management device according to another embodiment of the present invention.

Referring to FIG. 5, a rearing place management device 100 includes a photographing unit 110, a controller 120, a communicator 130, a sensor unit 140, a lighting controller 150, and a warning sound outputter 160.

Parts of the photographing unit 110, the controller 120, and the communicator 130 that are the same as those described above with reference to FIGS. 1 to 4 are not redundantly described here.

The sensor unit 140 senses an abnormal sign in the rearing place 10 in advance. Here, the sensor unit 140 may include various types of sensors capable of sensing an abnormal sign in the rearing place 10 except for the photographing unit 110 that senses image data. For example, the sensor unit 140 may include an odor sensor 142, a sound sensor 144, a heat sensor 146, and the like. For example, the odor of feces of sick livestock may be different from that of feces of healthy livestock. Thus, when the odor sensor 142 senses a specific odor, it may be expected that there are sick livestock in the rearing place 10. As another example, a sick animal, e.g., a chicken with avian influenza, may cough. Accordingly, when the sound sensor 144 senses a cough sound, it may be expected that there are sick livestock in the rearing place 10. As another example, sick livestock have a high temperature. Accordingly, when the heat sensor 146 senses heat, it may be expected that there are sick livestock in the rearing place 10.

As such, when the rearing place management device 100 further includes the sensor unit 140, the photographing unit 110 consuming a large amount of power need not be continuously operated and thus may be deactivated at normal times and activated by the sensor unit 140 only when an abnormal sign is sensed.

The lighting controller 150 may sense or control an intensity of illumination in the rearing place 10. For example, the intensity of illumination in the rearing place 10 may be set to be low or lighting may be turned off so that the livestock may sleep during the night time. When the intensity of illuminance in the rearing place 10 is not maintained at a certain level or higher, the photographing unit 110 may not be capable of obtaining effective image data for comparing behavior patterns. Sick livestock may have a severe cough or a high temperature during the night. Accordingly, the intensity of illuminance may be set to be low or the lighting may be turned off during the night, and when the sound sensor 142 senses an abnormal sign, the intensity of illuminance may be increased or the lighting may be turned on and the photographing unit 110 may be activated.

The warning sound outputter 160 outputs a warning sound when an abnormal sign is detected. Accordingly, even when an administrator has not yet checked the administrator terminal 200, the administrator is able to hear the warning sound and quickly respond to the abnormal sign.

Here, the photographing unit 110, the controller 120, the communicator 130, the sensor unit 140, the lighting controller 150 and the warning sound outputter 160 may be embodied as one integrated module together. Alternatively, the components of the photographing unit 110 and the sensor unit 140 except for some photographing units of the photographing unit 110 and some sensing units of the sensing unit 140 may be embodied as one integrated module together, and the photographing units and the sensing unit installed outside the integrated module may be embodied to communicate with the integrated module.

A rearing place management method performed by a rearing place management device according to another embodiment of the present invention will be described in more detail with reference to a flowchart.

Figure 6:
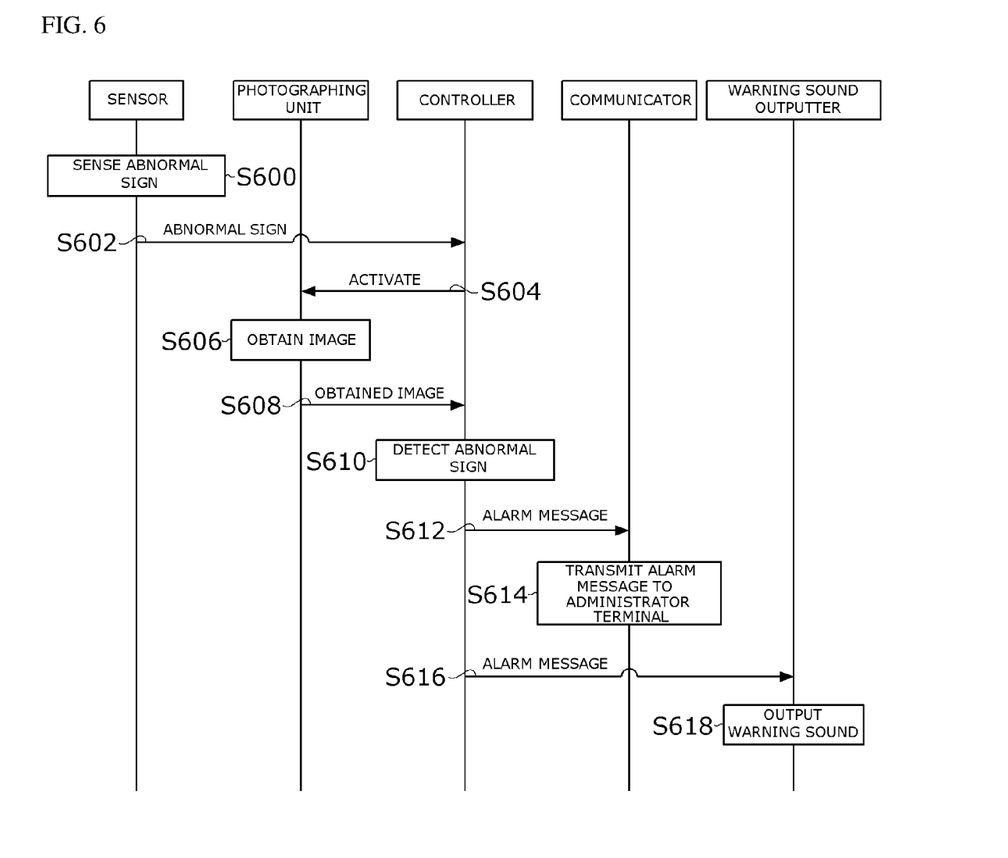
FIG. 6 is a flowchart of a rearing place management method performed by a rearing place management device according to another embodiment of the present invention.

FIG. 6 is a flowchart of a rearing place management method performed by a rearing place management device according to another embodiment of the present invention. A case in which a photographing unit is deactivated at normal times will be described below as an example.

Referring to FIG. 6, the sensor unit 140 senses an abnormal sign in the rearing place 10 (S600). For example, the odor sensor 142 may sense the odor of feces of sick livestock, the sound sensor 144 may sense a cough sound of the sick livestock, or the heat sensor 146 may sense a high temperature of the sick livestock.

When the sensor unit 140 notifies the controller 120 of the sensed abnormal sign (S602), the controller 120 activates the photographing unit 110 (S604). In this case, the controller 120 may notify the administrator terminal 200 in advance through the communicator 130 that the sensor unit 140 has sensed the abnormal sign.

Thereafter, the photographing unit 110 photographs the inside of the rearing place 10 (S606). The inside of the rearing place 10 may be photographed by the upper photographing unit 112 on the upper part of the rearing place 10 and the at least one side photographing unit 114 at the side of the rearing place 10.

When the photographing unit 110 transmits image data obtained by photographing the inside of the rearing place 10 to the controller 120 (S608), the controller 120 compares a behavior pattern in the image data with a behavior pattern in the normal image data (S306) and detects the abnormal sign (S610). A method of detecting the abnormal sign may be substantially the same as the method described above with reference to FIGS. 3 to 4.

When the controller 120 detects the abnormal sign, the controller 120 transmits an alarm message to the communicator130 (S612) and the communicator 130 transmits the alarm message to the administrator terminal 200 (S614). In addition, the controller 120 may transmit the alarm message to the warning sound outputter 160 (S616), and the warning sound outputter 160 may output the warning sound (S618).

Thereafter, the method described above with reference to FIG. 4 may be applied to a method of extracting an abnormal region from a region of interest after the detecting of the abnormal sign.

Figure 7:
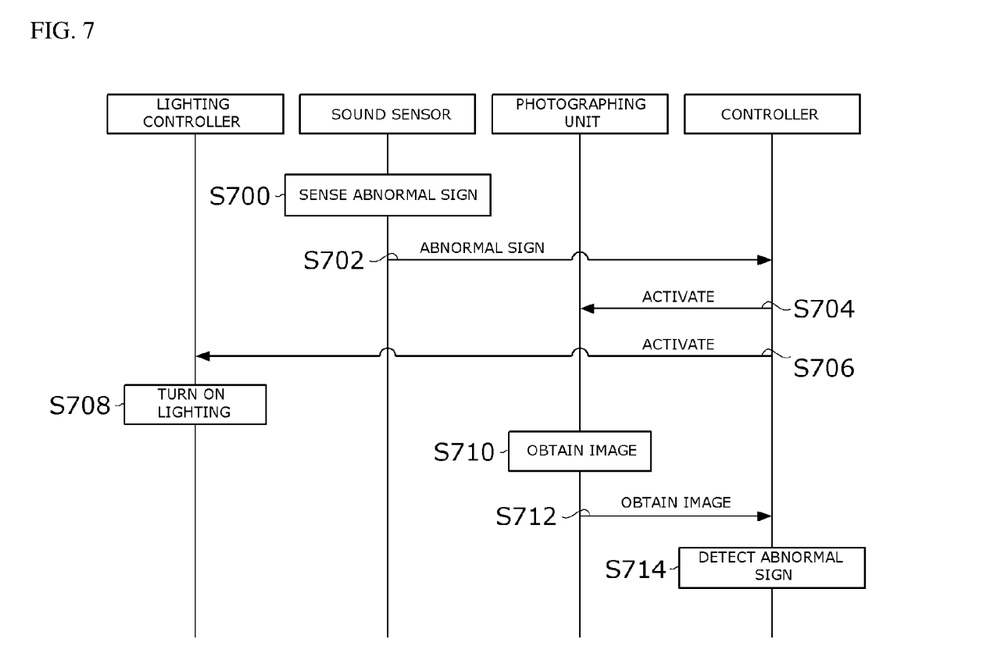
FIG. 7 is a flowchart of a rearing place management method performed by a rearing place management device according to another embodiment of the present invention.

FIG. 7 is a flowchart of a rearing place management method performed by a rearing place management device according to another embodiment of the present invention. It is assumed that a photographing unit is deactivated at night and lighting is turned off.

Referring to FIG. 7, the sound sensor 144 senses an abnormal sign in the rearing place 10 (S700). For example, the sound sensor 144 may sense a cough sound of sick livestock.

When the sound sensor 144 notifies the controller 120 of the sensed abnormal sign (S702), the controller 120 activates the photographing unit 110 (S704) and activates the lighting controller 150 (S706). In this case, the controller 120 may notify the administrator terminal 200 in advance through the communicator 130 that the sound sensor 144 has sensed the abnormal sign.

Thereafter, the lighting controller 150 turns on the lighting (S708), and the photographing unit 110 photographs the inside of the rearing place 10 (S710). The inside of the rearing place 10 may be photographed by the upper photographing unit 112 on the upper part of the rearing place 10 and the at least one side photographing unit 114 at the side of the rearing place 10.

When the photographing unit 110 transmits image data obtained by photographing the inside of the rearing place 10 to the controller 120 (S712), the controller 120 detects the abnormal sign by comparing a behavior pattern in the image data with a behavior pattern in normal image data (S714). A method of detecting the abnormal sign, a method of extracting a region of interest and an abnormal region, and the like may be substantially the same as the methods described above with reference to FIGS. 3 and 4.

The flowchart of the embodiment of FIG. 7 may be applied to an odor sensor and a heat sensor as well as a sound sensor. That is, when the odor sensor or the heat sensor senses an abnormal sign while the photographing unit is deactivated at night and lighting is turned off, the lighting may be turned on and the photographing unit 110 may be activated to obtain image data.

Figure 8:
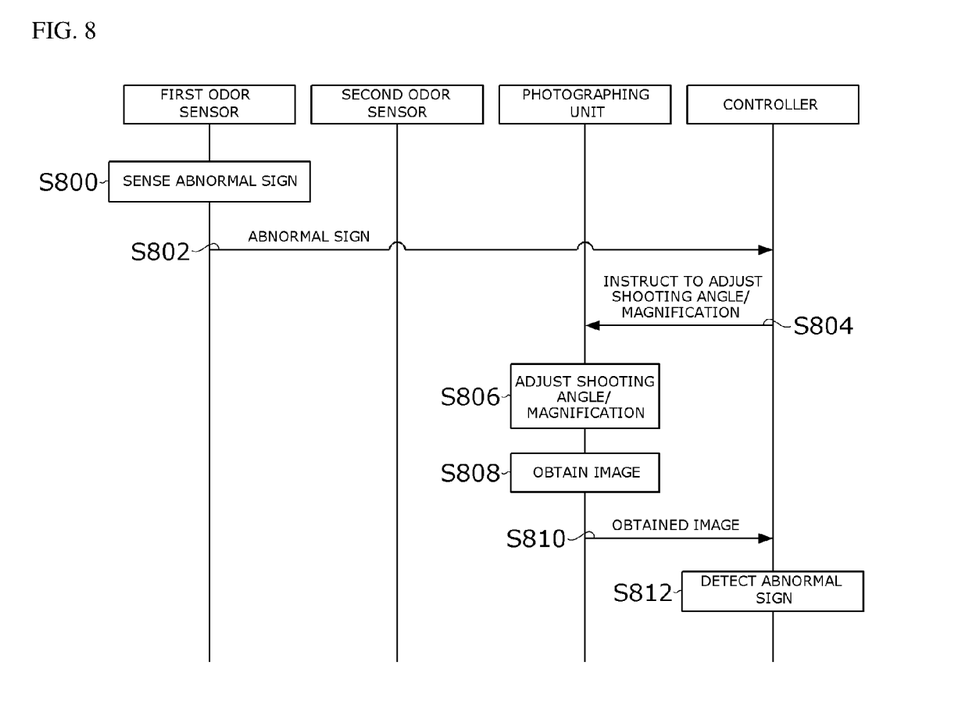
FIG. 8 is a flowchart of a rearing place management method performed by a rearing place management device according to another embodiment of the present invention.

FIG. 8 is a flowchart of a rearing place management method performed by a rearing place management device according to another embodiment of the present invention. Here, it is assumed that a plurality of odor sensors are arranged to be spaced apart from each other in the rearing place 10 and information regarding the positions of the odor sensors is stored in the controller 120. For example, an odor sensor may be disposed at each corner of the bottom of the rearing place 10.

Referring to FIG. 8, when a first odor sensor among the first odor sensor and a second odor sensor senses an abnormal sign in the rearing place 10 (S800), the controller 120 instructs the photographing unit 110 to adjust a shooting angle and magnification with respect to the vicinity of the first odor sensor (S804) when the controller 120 is notified of the abnormal sign sensed by the first odor sensor (S802). Thus, after the photographing unit 110 adjusts the shooting angle and magnification (S806), the photographing unit 110 photographs the inside of the rearing place 10 (S808).

When the photographing unit 110 transmits image data obtained by photographing the inside of the rearing place 10 to the controller 120 (S810), the controller 120 detects the abnormal sign by comparing a behavior pattern in the image data with a behavior pattern in normal image data (S812). A method of detecting the abnormal sign, a method of extracting a region of interest and an abnormal region, and the like may be substantially the same as the methods described above with reference to FIGS. 3 and 4.

As described above, when image data is obtained after an abnormal sign is sensed in advance by a sensor unit, a photographing unit need not be continuously operated, thereby reducing power consumption. Although it has been described above with reference to FIGS. 5 to 8 that the sensor unit 140, for example, the odor sensor 142, the sound sensor 144, or the heat sensor 146, senses an abnormal sign and notifies the controller 120 of the abnormal sign, embodiments of the present invention are not limited thereto. For example, the sensor unit 140 may only sense an environment in the rearing place 10 and transmit information regarding the environment to the controller 120, and the controller 120 may determine whether there is an abnormal sign in the environment in the rearing place 10 sensed by the sensor unit 140. For example, the odor sensor 142 may sense an odor in the rearing place 10 and transmit information regarding the odor to the controller 120, and the controller 120 may identify an abnormal sign by comparing the information received from the odor sensor 142 with previously input information regarding an odor in a normal state. Alternatively, the sound sensor 144 may sense sound in the rearing place 10 and transmit information regarding the sound to the controller 120, and the controller 120 may identify an abnormal sign by comparing the information received from the sound sensor 144 with previously input information regarding sound in a normal state. Alternatively, the heat sensor 146 may sense a heat distribution in the rearing place 10 and transmit information regarding the heat distribution to the controller 120, and the controller 120 may identify an abnormal sign by comparing the information received from the heat sensor 146 and previously input information regarding a heat distribution in a normal state.

While the present invention has been described above with respect to exemplary embodiments thereof, it should be understood by those of ordinary skill in the art that various changes and modifications may be made without departing from the technical conception and scope of the present invention defined in the following claims.

The invention claimed is:

1. A rearing place management device comprising:
a photographing unit configured to generate image data by photographing a rearing place;
a controller configured to detect an abnormal sign in the rearing place by comparing a behavior pattern in the image data generated by the photographing unit with a behavior pattern in normal image data; and
a communicator configured to transmit information about the abnormal sign,
wherein the controller extracts a region of interest including the abnormal sign from the generated image data, transmits information about the region of interest to the photographing unit, receives image data obtained by photographing the region of interest from the photographing unit, and extracts an abnormal region narrower than the region of interest from a behavior pattern in the image data of the region of interest.

2. The rearing place management device of claim 1, wherein the photographing unit adjusts a shooting angle and magnification of the photographing unit using the information about the region of interest to photograph the region of interest.

3. The rearing place management device of claim 2, further comprising a sensor unit configured to sense the abnormal sign in the rearing place,
wherein the photographing unit is activated when the abnormal sign is sensed by the sensor unit.

4. The rearing place management device of claim 3, further comprising a lighting controller configured to adjust an intensity of illuminance in the rearing place,
wherein the sensor unit comprises a sound sensor configured to sense sound in the rearing place, and
when the abnormal sign is sensed by the sound sensor, the lighting controller increases the intensity of illuminance in the rearing place and the photographing unit is activated.

5. The rearing place management device of claim 3, further comprising a lighting controller configured to adjust an intensity of illuminance in the rearing place,
wherein the sensor unit comprises an odor sensor configured to sense an odor in the rearing place, and
when the abnormal sign is sensed by the odor sensor, the lighting controller increases the intensity of illuminance in the rearing place and the photographing unit is activated.

6. The rearing place management device of claim 5, wherein a plurality of odor sensors are installed to be spaced apart from each other in the rearing place,
wherein information about a position of each of the plurality of odor sensors is stored in the controller, and
when the abnormal sign is sensed by one of the plurality of odor sensors, the controller controls the photographing unit to control a shooting angle and magnification with respect to the vicinity of the one odor sensor.

7. The rearing place management device of claim 1, wherein the photographing unit comprises an upper photographing unit on an upper part of the rearing place and at least one side photographing unit at a side of the rearing place, and
the controller synchronizes image data obtained by the upper photographing unit with image data obtained by the at least one side photographing unit in real time.

8. The rearing place management device of claim 1, wherein the controller identifies a level of the abnormal sign according to a similarity between the behavior pattern in the generated image data and the behavior pattern in the normal image data and divides the region of interest into a first region of interest, a second region of interest, and a third region of interest according to the level of the abnormal sign.

9. The rearing place management device of claim 8, wherein the controller controls the photographing unit to differently set an orientation and a magnification of the region of interest according to the first region of interest, the second region of interest, and the third region of interest.

10. The rearing place management device of claim 9, wherein the controller sets a magnification for a region of interest determined to have the highest-level abnormal sign to be higher than a magnification for a region of interest determined to have a relatively low level abnormal sign.

11. A rearing place management method comprising:
photographing a rearing place by a photographing unit;
detecting, by a controller, an abnormal sign in the rearing place by comparing a behavior pattern in image data obtained by the photographing unit with a behavior pattern in normal image data;
transmitting information about the abnormal sign to an administrator terminal by a communicator;
extracting, by the controller, a region of interest including the abnormal sign from the obtained image data;
transmitting, by the controller, information about the region of interest to the photographing unit;
receiving, by the controller, image data obtained by photographing the region of interest from the photographing unit; and
extracting, by the controller, an abnormal region narrower than the region of interest from the behavior pattern in the image data obtained by photographing the region of interest.

12. The rearing place management method of claim 11, wherein the photographing unit adjusts a shooting angle and magnification thereof using the information about the region of interest to photograph the region of interest.

13. The rearing place management method of claim 12, further comprising:
sensing the abnormal sign in the rearing place by a sensor unit; and
activating the photographing unit.

14. The rearing place management method of claim 13, further comprising, after the sensing of the abnormal sign in the rearing place, increasing an intensity of illuminance in the rearing place by a lighting controller.

15. The rearing place management method of claim 14, wherein the sensor unit comprises a plurality of odor sensors installed to be spaced apart from each other in the rearing place, and the sensing of the abnormal sign in the rearing place comprises, when one of the plurality of odor sensors senses an abnormal sign in the rearing place, the controller controls the photographing unit to adjust the shooting angle and magnification with respect to the vicinity of the one odor sensor.

16. The rearing place management method of claim 13, wherein the sensor unit comprises an odor sensor configured to sense an odor in the rearing place, and the rearing place management method further comprising, when the abnormal sign is sensed by the odor sensor, increasing the intensity of illuminance in the rearing place by the lighting controller; and activating the photographing unit.

17. The rearing place management method of claim 11, wherein the photographing of the rearing place further comprises the controller synchronizing image data obtained by an upper photographing unit with image data obtained by the at least one side photographing unit.

18. The rearing place management method of claim 11, wherein the extracting the region of interest further comprises the controller identifying the level of an abnormal sign according to a similarity between the behavior pattern in the generated image data and the behavior pattern in the normal image data and dividing the region of interest into a first region of interest, a second region of interest, and a third region of interest according to the level of the abnormal sign.

19. The rearing place management method of claim 18, further comprising, after the extracting the region of interest, controlling, by the controller, the photographing unit to differently set an orientation and a magnification of the region of interest according to the first region of interest, the second region of interest, and the third region of interest.

20. The rearing place management method of claim 19, further comprising, setting, by the controller, a magnification for a region of interest determined to have the highest-level abnormal sign to be higher than a magnification for a region of interest determined to have a relatively low level abnormal sign.

\* \* \* \* \*